June 1, 1937. K. R. SHAW 2,082,743
METHOD OF AND MACHINE FOR PRODUCING RUBBER THREAD
Filed Feb. 16, 1935 2 Sheets-Sheet 1

INVENTOR:
Kenneth R. Shaw,
BY
ATTORNEY

June 1, 1937. K. R. SHAW 2,082,743
METHOD OF AND MACHINE FOR PRODUCING RUBBER THREAD
Filed Feb. 16, 1935 2 Sheets-Sheet 2
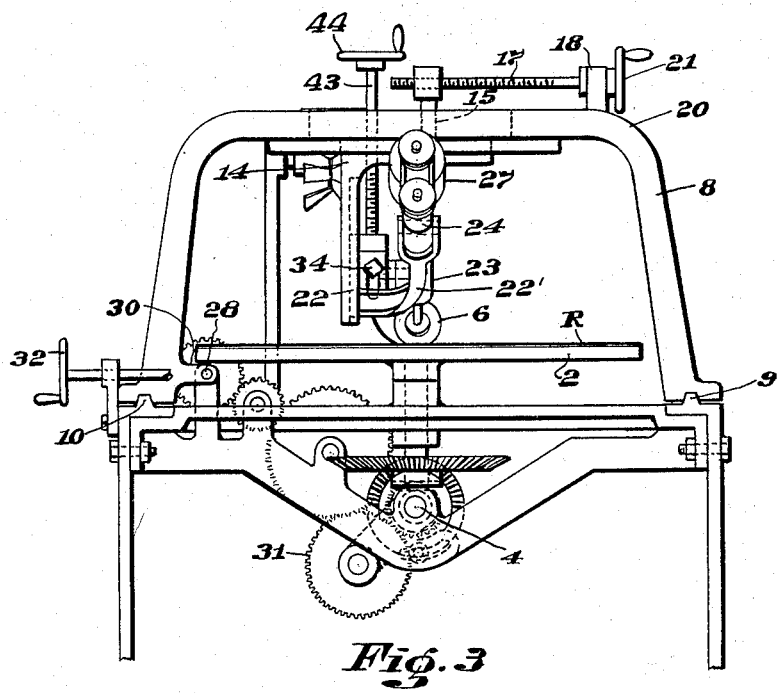
Fig. 3
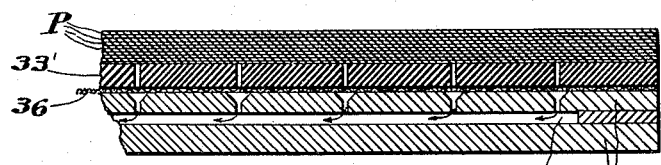
Fig. 5
Fig. 4
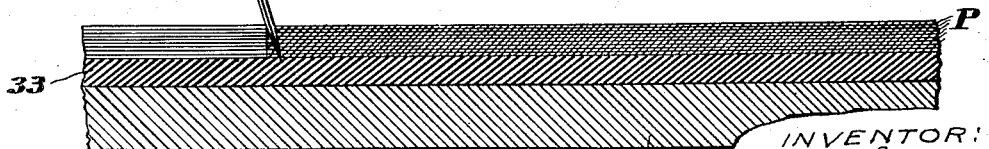
INVENTOR:
Kenneth R. Shaw,
BY
his ATTORNEY.

Patented June 1, 1937

2,082,743

UNITED STATES PATENT OFFICE 2,082,743

METHOD OF AND MACHINE FOR PRODUCING RUBBER THREAD

Kenneth R. Shaw, Easthampton, Mass., assignor to Easthampton Rubber Thread Co., Easthampton, Mass., a corporation of Massachusetts Application February 16, 1935, Serial No. 6,865

11 Claims. (Cl. 164—37)

This invention relates to methods of and machines for manufacturing rubber thread from sheet rubber.

The usual method of manufacturing rubber thread from calendered rubber consists in winding a sheet of rubber on a drum and then cutting simultaneously through all of the plies or convolutions on the drum with a sharp edged revolving disk cutter, the cutter being fed axially of the drum at a predetermined and fixed rate while the drum is revolved. The cross-sectional dimension of the thread so produced is determined by the thickness of the rubber sheet and the rate of axial feed of the cutter.

Serious objections to this method are; first, that the length of each thread so cut is limited to the length of the sheet of rubber wound on the drum. This method, therefore, does not permit the production of as long lengths as frequently are desired for the warp threads of woven elastic webbing. Second, no practical way has been devised for guiding the individual threads away from the cutting point without having them become entangled with each other. It is therefore necessary after the cutting operation has been completed, to untangle the entire mass and this step adds materially to the expense of manufacture.

The present invention deals especially with the difficulties above mentioned and it aims to devise a thoroughly practical solution for the problem presented by them.

The nature of the invention will be readily understood from the following description when read in connection with the accompanying drawings, and the novel features will be particularly pointed out in the appended claims.

In the drawings,

Fig. 3 is an end view of the machine;

Fig. 4 is a sectional view, partly in elevation and on a larger scale, illustrating additional details of this arrangement; and Fig. 5 is a vertical, sectional view of another form of work supporting table showing the work positioned on it.

Figure 1:
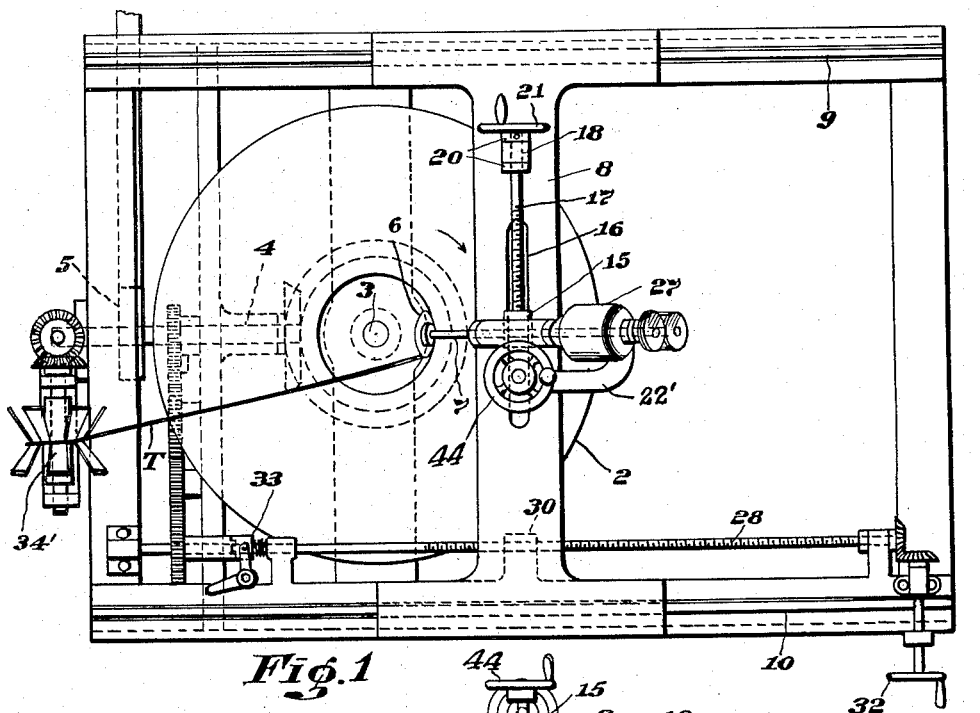
Figure 1 is a plan view of a machine embodying features of this invention.

According to the method of this invention a circular sheet of rubber is revolved edgewise against the sharpened edge of a rapidly moving knife, while holding the sheet in a flat condition, and relatively feeding the sheet and the knife to cause the knife to cut a continuous thread of rubber from said sheet. Preferably a series of such sheets are assembled in superposed relationship, and the knife cuts simultaneously through all of them so that several threads are produced at a single cutting operation. Preferably, also, the sheets are temporarily secured to each other so that the threads are all joined together, forming a tape-like structure which may be conveniently handled in taking the product away from the machine, the nature of the union between the threads being such that it can readily be broken to separate the individual threads from each other.

The machine shown in the drawings for producing thread in accordance with this invention comprises a horizontal turn table 2 mounted in suitable bearings to revolve about a vertical axis. A shaft 3, Fig. 2, supports the table and is connected through bevel gearing with a main horizontal drive shaft 4 equipped with a pulley 5 which may be belted to any convenient source of power.

Figure 2:
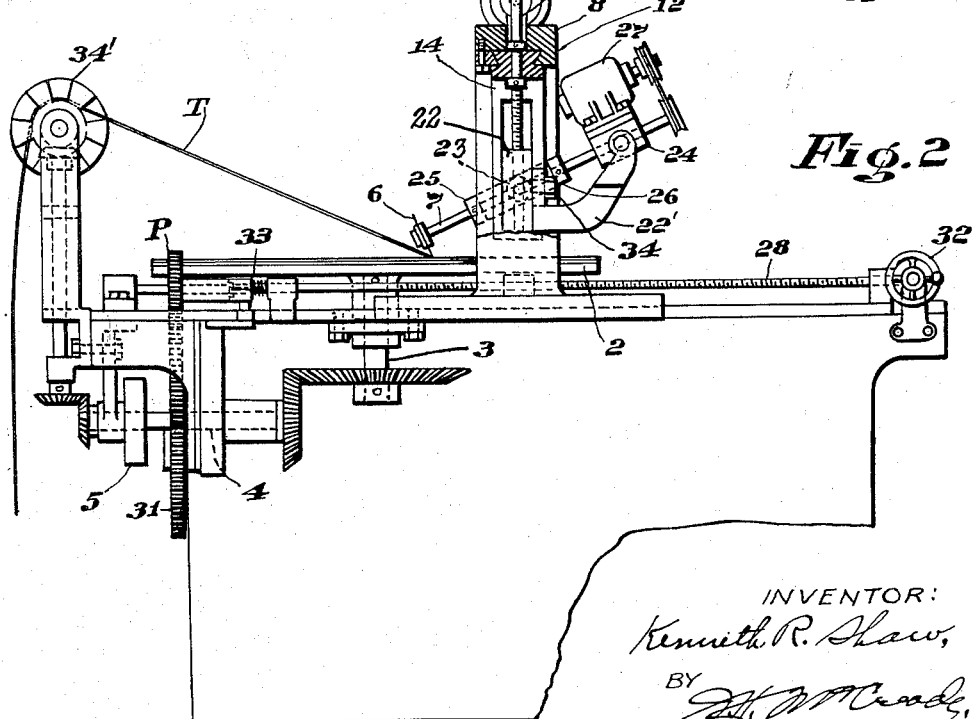
Fig. 2 is a side elevation of the machine illustrated in Fig. 1.

Mounted in cooperative relationship to the turn table is a rotary disk cutter or knife 6 secured on the end of a shaft 7 which is supported in suitable bearings. In the particular arrangement shown the knife and its adjusting mechanism are mounted on a travelling head or tool carrier 8 which, as best shown in Fig. 3, is of an inverted U-shape so that it can straddle the table 2. It rests on horizontal ways or guides 9 and 10 at opposite sides of the machine frame. In the horizontal bridge portion of the head 8 a dove-tail guideway 12, Fig. 2, is provided to support a slide 14 for horizontal movement transversely of the machine, and this slide carries an arm 15 which projects upward through a slot 16 in the part 8, the arm being internally threaded to receive a horizontal adjusting screw 17. A bearing 18 supports one end of the screw, and collars 20—20 at opposite sides of it are pinned to the screw shaft 17 to prevent axial movement of this shaft. Consequently, by revolving the hand wheel 21, which is secured to the end of the shaft 17, the slide 14 may be adjusted horizontally across the machine. This slide carries the knife 6 so that the movement just described also adjusts the knife.

For the purpose of adjusting the knife vertically the parts which immediately support it are mounted on a bracket 22 which slides in a vertical dove-tail guideway formed in the slide 14, previously mentioned, and a screw 43 equipped with a hand wheel 44 takes into the bracket and is supported in the slide 14 for rotation about its own axis, but is held against axial movement longitudinally of itself.

In addition to the foregoing, the tool carrier or head 8 is adjustable horizontally on the ways 9 and 10 so that the arrangement just described provides for the adjustment of the knife 6 in three planes at right angles to each other It is desirable in order to produce good running conditions to support the knife shaft 7 with its axis inclined toward the table at such an angle that it will intersect the axis of the turn table shaft 3 in approximately the plane of the upper surface of said table. For this reason the bracket 22 is provided with a lower bearing 23, Fig. 2, and an upper bearing 24 for the shaft 7, suitable thrust collars 25 and 26 cooperating with the lower bearing to prevent any substantial endwise movement of the shaft.

The power for driving the cutter 6 may be furnished by an electric motor 27 mounted on the upper bearing 24, and belted or otherwise connected to the knife shaft 7.

Mechanism is also provided for relatively feeding said turn table and the knife or cutter 6 axially of the turn table while the cutting operation progresses. This mechanism comprises a screw threaded shaft 28, mounted in suitable bearings carried by the machine frame and equipped with thrust collars which prevent any axial movement of this shaft but permit it to rotate. The shaft is threaded through an arm 30 rigid with the head 8 so that rotation of the shaft slides the head along the ways 9 and 10. Gear connections between the shaft 28 and the main shaft 4 are provided, as shown in Fig. 3, to drive the former at a fixed and definite ratio to the latter, the gear chain, however, including a change gear 31, Fig. 3, so that the ratio of the drive between the two shafts 4 and 28 can be changed, as desired. With this arrangement, therefore, the knife 6 will be fed radially a predetermined distance during each revolution of the turn table.

For the purpose of providing for the manual adjustment of the head 8 and the parts carried thereby, a hand wheel 32, Fig. 1, is connected with the shaft 28 through bevel gearing, and the driving connections between the gear train above mentioned and the shaft 20 are made through a manually operable clutch 33, Fig. 1, by means of which the automatic drive or feed of the head 8 can be interrupted, whenever desired, as for example, when the operator wishes to adjust the head manually.

In order to produce a clean cut, the upper surface of the turn table should be covered with some material into which the edge of the knife can cut without dulling it. Any suitable material may be used for this purpose, but I have found that unvulcanized rubber in which cuts are approximately self-healing answers this purpose particularly well. Such a facing for the turn table is shown in Fig. 4 at 33.

Assuming that a series of sheets of rubber of circular outline and of suitable dimensions are adhesively joined together in superposed relationship and placed on the turn table 2, the knife 6 may be properly adjusted to them and the cutting operation may then proceed. This operation may be started at the circumference of the rubber disks or sheets, the knife revolving at a high speed and cutting cleanly through the plies, while at the same time the knife is fed at a predetermined rate radially of the turn table. As above stated, this operation will cut a continuous thread from each sheet of rubber. If the sheets are adhesively secured together, as by shellac or some other suitable adhesive, the rubber threads also will be joined to each other and will come off in the form of a tape, as indicated at T, Figs. 1 and 2. This tape is guided over a slotted and grooved take-off roll 34' of the well known form, the roll being driven through gear connections with the main shaft 4. After leaving the take-off roll the tape may be wound on a beam or any other suitable support.

It will be observed, however, that in cutting in the manner just described at the circumference of a series of superposed circular disks there would be a tendency for the edges of the rubber disks to rub or bind against the flat surface of the knife, due to the fact that the knife is bearing against the outer circumference of the rubber body. In other words, in this position the knife would not "clear" properly. Also, the contact between the edge of the knife 6 and the surface of the rubber facing 33 must have a substantial length. Such an arrangement as that just described, therefore, would cut the surface of the facing 33 badly and ruin it in a relatively short time. For the purpose of avoiding these difficulties the rubber sheets or plies P are made of annular form, the knife is mounted on an angle, as shown, and it is adjusted to cut along the inner circumferences of the plies instead of acting on their outer circumferences. With this arrangement the knife tends to roll around the axis of the turn table like a bevel gear, thus cutting a spiral path in the surface of the facing 33 and reducing the mutilation of this facing to a minimum. Also, successive portions of the newly formed edge surfaces of the plies P immediately adjacent to the cutting point, instead of crowding against the flat surface of the knife, swing away from this surface and thus provide the clearance for the knife desirable for smooth operation. The degree of clearance will vary with the radius of the inner circumference of the rubber body, and if that is made sufficient to produce good running conditions at the start of the operation, these conditions will improve as the radius increases. Water should, of course, be fed on to the cutter 6 continuously during the cutting operation.

It may also be pointed out that while the angle of the knife shaft 7 should theoretically be different for different radii of the circumference on which the knife is working, it can be set for a given average condition which will be satisfactory from an operating standpoint. It may be convenient, however, to provide for the adjustment of this angle, and for this purpose the arm 22' of the slide 22 preferably is made vertically adjustable on the main body of the slide, the arm being slotted to take a bolt 34, Fig. 2, which is threaded into the main body of the slide 22 and secures the arm in various vertical positions of adjustment. By pivotally mounting the bearings 23 and 24 for the shaft 7 in the slide, they will automatically adjust themselves to the shaft as the relative relationship of the arm 22 to its support is changed.

According to the preferred method the sheets of rubber are vulcanized before the thread cutting operation is begun so that the thread may be run directly from the machine to the winding or spooling machinery. A convenient procedure consists in winding an unvulcanized sheet of suitable thickness as it comes from the calender on a drum until a layer of any desired thickness, for example, one-half inch, has been built up. The sheet or web is dusted with talc during the winding operation so that the plies will not adhere firmly to each other. At the completion of this winding step the roll is removed, placed over a large turn table, and the rubber body wound on it is cut lengthwise of the roll and allowed to drop on to the turn table where it flattens out. This turn table may then be revolved and knives brought to bear on the rubber to cut the annular rings which later will be used in the machine above described. The scrap rubber is returned to the calender for re-working. A heavy iron plate may now be placed on the rubber on the turn table and fastened to it to clamp the rubber sheets between it and the turn table top. Such an assembly, with others produced in the same manner, may then be stacked and transferred to a vulcanizer where the rubber sheets will be cured. Later the annular disks of rubber so produced are removed and the desired number of them are placed on the turn table 2 in superposed relationship and are secured to each other by shellac or some other suitable adhesive. The thread cutting operation then proceeds, as above described. Since the rubber disks are accurately molded to size, very little vulcanized scrap is produced. Also, because the thread comes from the machine in the form of a tape or strip, any tangling of it is readily avoided, but the individual threads can easily be separated by placing the rubber under tension. If necessary, the thread can be coiled in delivery cans, washed, dried and shipped to the weavers, knitters or braiders in readiness to be wound on their warp beams.

Two important advantages are realized by this process: first, the production of rubber thread in much longer lengths than has been possible by the usual commercial methods; and second, control of the threads during and after the cutting operation, so that any tangling of them can readily be avoided. The method also lends itself conveniently to the production of a rubber tape or a composite rubber thread composed of individual threads adhesively bonded together so that they are held in a certain definite relationship to each other, but nevertheless are sufficiently independent to be readily separated when desired. In producing such a product the plies of rubber are bonded together with a rubber cement, rubber latex, or by a controlled adhesion of the unvulcanized sheets to each other.

It will be observed that in making rubber thread by this method, the cross-sectional dimensions of each thread will be determined by the thickness of the sheet of rubber from which it is cut and the rate of radial feed of the knife 6 during each revolution of the turn table. These factors are controllable and, consequently, the dimensions of the thread produced can readily be predetermined.

It is not always necessary to cement the sheets or plies of rubber together. In cutting heavy rubber the weight of the rubber itself is sufficient to hold it in place. If the plies are not secured together they may be held in place by annular rings placed on the topmost ply and removed progressively as the cutting operation proceeds, or they may be weighted in any other convenient manner. In some cases it is desirable to use the arrangement illustrated in Fig. 5 in which the turn table 2' is made hollow and the chamber 35 in it is connected through an axial bore in the shaft 3 with a vacuum pump. The upper wall of this chamber is given a foraminous structure, and the rubber facing 33' is perforated at frequent intervals so that the plies P of rubber are held against the upper surface of the facing 33' by air pressure created by the suction. Preferably a sheet 36 of some very closely woven fabric is interposed between the upper surface of the turn table and the facing 33', and this sheet material is kept wet by the small stream or drip water which runs continuously on the knife 6 to facilitate the cutting operation. Consequently, this interposed sheet greatly retards the flow of air through it and into the vacuum chamber 35. Such an arrangement is useful in preventing too free a flow of air into the vacuum chamber as the perforations through the facing 33' are exposed due to the gradual removal of the rubber plies P by the cutting operation.

While I have herein shown and described a typical embodiment of my invention, it will be understood that the invention may be embodied in other forms without departing from the spirit or scope thereof. The method disclosed in this application is not claimed here but is claimed in my copending application Serial No. 31,219, filed July 13, 1935.

Having thus described my invention, what I desire to claim as new is:

1. In a machine of the character described, the combination of a turn table adapted to support a circular sheet of rubber, mechanism for revolving said table, a disk knife, a shaft supporting said knife in position to cut said sheet on the table, means supporting said shaft with its axis inclined to approximately intersect the axis of the table in the neighborhood of the plane of the table top, mechanism for revolving said knife, and mechanism for feeding said knife radially of the table in a predetermined ratio to the speed of revolution of said table.

2. In a machine of the character described, the combination of a turn table adapted to support a circular sheet of rubber, a disk knife, means for operating said knife, mechanism for supporting said knife for adjustment of its axis into different angular relationships to the plane of said table, mechanism for revolving said table to present successive portions of the edge of said sheet to said knife, and mechanism for relatively feeding said turn table and said knife substantially radially of the turn table while the knife cuts into the edge of said sheet.

3. In a machine of the character described, the combination of a horizontal turn table adapted to support a circular sheet of rubber, mechanism for revolving said table, a disk knife, means supporting said knife for operation on said sheet of rubber supported on said turn table, said means also supporting said knife for adjustment both vertically and angularly with reference to the table, mechanism for revolving said knife, and mechanism for relatively feeding said turn table and said knife radially of the turn table in a predetermined ratio to the speed of revolution of said table.

4. In a machine of the character described, the combination of a turn table adapted to support a circular sheet of rubber, mechanism for revolving said table, a disk knife, means supporting said knife with its cutting edge positioned to cut through said sheet and its axis inclined toward the center of the table, said means also supporting said knife for bodily movement toward and from the surface of said table, mechanism for revolving said knife, and mechanism for relatively feeding said turn table and said knife outwardly substantially radially of the table in a predetermined ratio to the speed of revolution of said table.

5. In a machine of the character described, the combination of a horizontal turn table adapted to support a circular sheet of rubber, said turn table having a vacuum chamber therein, perforations leading from said chamber to the upper surface of said table, a backing layer of yielding material secured to the upper surface of said table to revolve therewith, perforations extending through said layer and communicating with the perforations in said table mechanism for revolving said table around its axis, a disk knife, mechanism for revolving said knife, means supporting said knife with its cutting edge in position to cut through the edge of a sheet of rubber supported on said backing layer on the turn table, and mechanism for relatively feeding said turn table and said knife substantially radially of the turn table at a predetermined ratio to the speed of revolution of said table.

6. In a machine of the character described, the combination of a horizontal turn table, a backing layer of yielding material secured to the upper surface of said table to revolve therewith, mechanism for revolving said table about its axis, a disk knife, mechanism for revolving said knife, means for supporting said knife in an angular position with reference to said table and in position to cut through the circular sheet of rubber supported on said backing layer and to cut into the material of said layer, and mechanism for relatively feeding said knife and said table substantially radially of the turn table in a predetermined ratio to the speed of revolution of said table.

7. In a rubber thread cutting machine, the combination of a turn table adapted to support a stack of annular plies of rubber, mechanism for revolving said table, a disk knife, a shaft supporting said knife in position for it to cut through said plies, means for operatively supporting said shaft with its axis inclined downwardly toward the center of said turn table, mechanism for revolving said knife, said turn table having a facing of yielding material to support said plies and into which the edge of the knife can cut without dulling it, and mechanism for feeding said knife radially of the table in a predetermined ratio to the speed of revolution of said table.

8. In a machine of the character described, the combination of a turn table adapted to support a stack of circular sheets of rubber, a disk knife, means for revolving said knife, mechanism for supporting said knife in cooperative relationship to said stack of circular sheets, mechanism for revolving said table to present successive portions of the edge of said stack to said knife, mechanism for relatively feeding said turn table and said knife in a direction approximately radial of the turn table to advance the cutting point as the cutting operation progresses, said turn table having a vacuum chamber therein for holding said stack on the turn table by suction, and means between said chamber and said stack for distributing the flow of air into said chamber and so retarding said flow as to prevent a serious reduction of the vacuum as the cutting operation progresses and the area of said stack resting on the turn table is correspondingly reduced.

9. In a machine of the character described, the combination of a turn table adapted to support a stack of circular sheets of rubber, said turn table having a vacuum chamber therein and said chamber having a foraminous wall for supporting said stack, whereby said stack will be held on said turn table by suction, mechanism for revolving said table around its axis, a knife for cutting the edge of said stack, mechanism for operating said knife, mechanism for relatively feeding said turn table and said knife substantially radially of the turn table at a predetermined ratio to the speed of revolution of said table, whereby said knife is operative to cut a thin strip from the edge of said stack of rubber sheets, and a disk of air pervious sheet material interposed between the foraminous wall of said vacuum chamber and said stack and adapted to retard the flow of air from around said stack into said chamber and thereby to prevent the increase in exposure of the turn table surface as the cutting operation progresses from reducing the suction to such a point that it will be inoperative to hold the stack on the turn table.

10. In a machine of the character described, the combination of a turn table adapted to support a stack of annular sheets of rubber, a disk knife capable of cutting continuously through the entire thickness of said stack, means for revolving said knife, mechanism for revolving said table to present successive portions of the edge of said stack to said knife, mechanism for relatively feeding said turn table and said knife to move the knife outwardly away from the axis of said turn table at a predetermined ratio to the speed of revolution of said turn table as the cutting operation progresses, and means supporting said knife to cut through said stack and into contact with said supporting means whereby said knife will cut a rubber thread from each of said plies as said cutting and feeding operations continue.

11. In a rubber thread cutting machine, the combination of a turn table adapted to support a stack of circular plies of rubber, a disk knife capable of cutting simultaneously through the entire thickness of said stack, means supporting said knife for said cutting operation, mechanism for revolving said knife, mechanism for revolving said table to present successive portions of the edge of said stack to said knife, said turn table having a facing of yielding material to support said stack and into which the edge of said knife can cut without dulling it, and mechanism for relatively feeding said turn table and said knife to move the knife radially of the table in a predetermined ratio to the speed of revolution of said table.

KENNETH R. SHAW.